(12) United States Patent
Bingham

(10) Patent No.: US 10,927,526 B1
(45) Date of Patent: Feb. 23, 2021

(54) HYDRAULIC WAVE TUNER

(71) Applicant: Deere & Company, Moline, IL (US)

(72) Inventor: Peter E. Bingham, Epworth, IA (US)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 16/596,264

(22) Filed: Oct. 8, 2019

(51) Int. Cl.
  *F15B 21/00* (2006.01)
  *E02F 9/22* (2006.01)

(52) U.S. Cl.
  CPC .......... *E02F 9/2278* (2013.01); *E02F 9/2203* (2013.01); *E02F 9/2271* (2013.01); *F15B 21/008* (2013.01)

(58) Field of Classification Search
  CPC .................................................... F15B 21/008
  See application file for complete search history.

(56) References Cited

U.S. PATENT DOCUMENTS

| | | | | |
|---|---|---|---|---|
| 5,492,451 | A * | 2/1996 | Franz | F04B 11/0075 417/312 |
| 6,234,758 | B1 * | 5/2001 | Pawelski | F04B 11/0016 417/26 |
| 6,854,269 | B2 * | 2/2005 | Hale | F04B 1/2021 417/540 |
| 8,500,187 | B2 * | 8/2013 | van't Veen | B60J 7/1273 296/107.01 |
| 10,061,343 | B2 | 8/2018 | Fredrickson et al. | |
| 2011/0036083 | A1 | 2/2011 | van't Veen | |

FOREIGN PATENT DOCUMENTS

KR    20190074555 A    6/2019

OTHER PUBLICATIONS

Ahmadkhanlou, Farzad, "Design, Modeling and Control of Magnetorheological Fluid-Based Force Feedback Dampers for Telerobotic Systems," Apr. 2008 (19 pages).

* cited by examiner

*Primary Examiner* — Thomas E Lazo
(74) *Attorney, Agent, or Firm* — Michael Best & Friedrich LLP

(57) ABSTRACT

A work vehicle has a chassis, and a member connected to the chassis for movement with respect to the chassis. An actuator is connected to the chassis and to the member to move the member with respect to the chassis. A hydraulic circuit is connected to the actuator and a pump pressurizes fluid in the hydraulic circuit. An adjustable quarter wave tuner is connected to the hydraulic circuit. The adjustable quarter wave tuner has a length that is adjustable within a range of lengths to thereby reduce noise caused by the pump across a corresponding range of frequencies. In some embodiments, the member is a linear actuator, such as a hydraulic cylinder. In other embodiments, the member is a rotary actuator, such as a hydraulic motor.

18 Claims, 5 Drawing Sheets

HYDRAULIC WAVE TUNER

BACKGROUND

The present disclosure relates to hydraulic wave tuners configured to reduce pressure ripples in a hydraulic system.

SUMMARY

In one embodiment, the disclosure provides a work vehicle having a chassis, and a member connected to the chassis for movement with respect to the chassis. An actuator is connected to the chassis and to the member to move the member with respect to the chassis. A hydraulic circuit is connected to the actuator and a pump pressurizes fluid in the hydraulic circuit. An adjustable quarter wave tuner is connected to the hydraulic circuit. The adjustable quarter wave tuner has a length that is adjustable within a range of lengths to thereby reduce noise caused by the pump across a corresponding range of frequencies. In some embodiments, the member is a linear actuator, such as a hydraulic cylinder. In other embodiments, the member is a rotary actuator, such as a hydraulic motor.

In another embodiment the disclosure provides a hydraulic circuit including a reservoir that retains hydraulic fluid, an actuator connected to the reservoir, and a pump connected to the reservoir and to the actuator. The pump moves fluid from the reservoir to the actuator. An adjustable quarter wave tuner is connected to the actuator and to the pump. The adjustable quarter wave tuner has a length that is adjustable within a range of lengths to thereby reduce noise caused by the pump across a corresponding range of frequencies. A sensor is positioned proximate to the adjustable quarter wave tuner to sense a pressure in the hydraulic circuit. A controller is connected to the sensor to receive the sensed pressure from the sensor. The controller is connected to the adjustable quarter wave tuner to thereby adjust the length of the adjustable quarter wave tuner in response to the sensed pressure.

Other aspects of the disclosure will become apparent by consideration of the detailed description and accompanying drawings.

DETAILED DESCRIPTION

Before any embodiments of the disclosure are explained in detail, it is to be understood that the disclosure is not limited in its application to the details of construction and the arrangement of components set forth in the following description or illustrated in the following drawings. The disclosure is capable of other embodiments and of being practiced or of being carried out in various ways.

Figure 1:
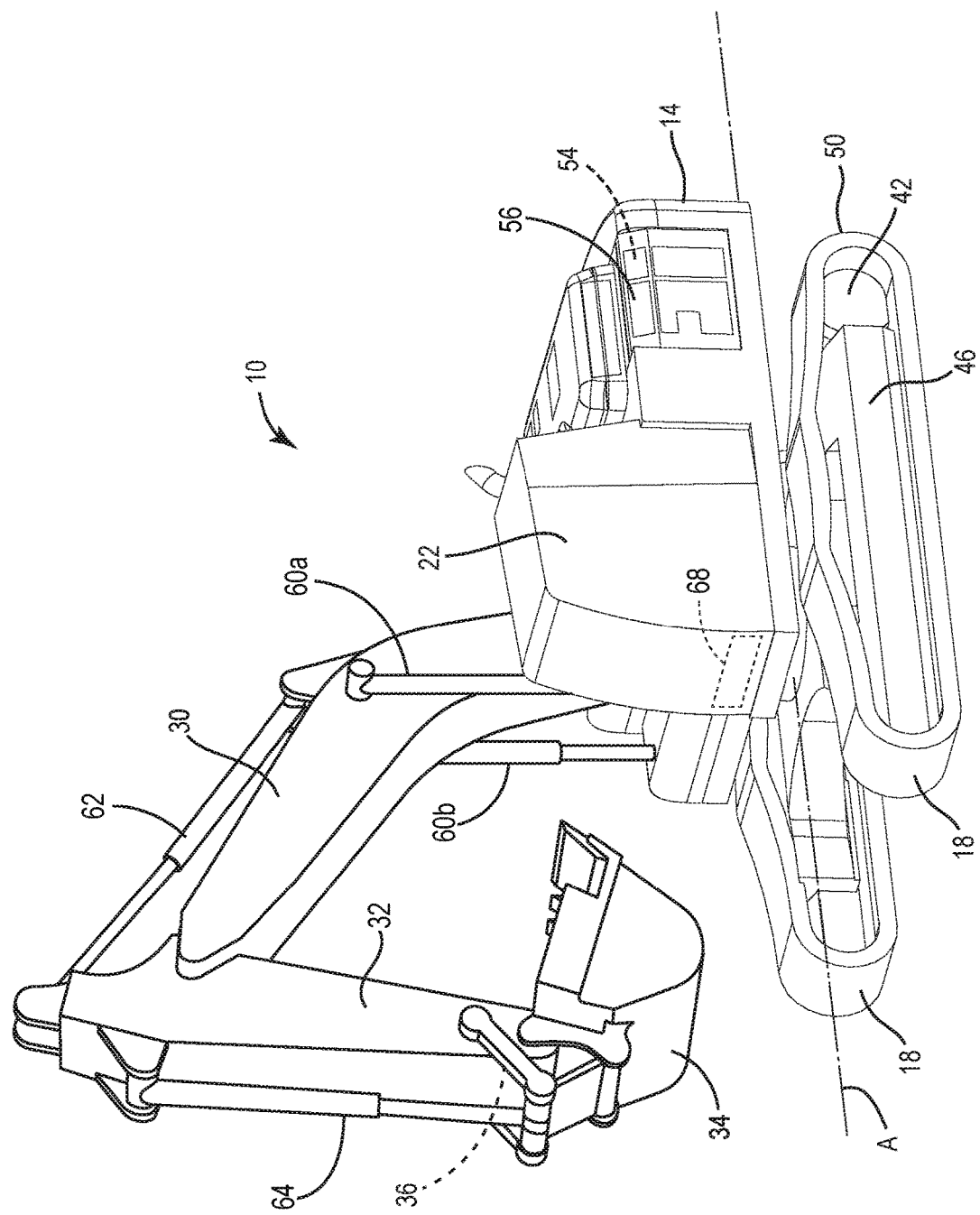
FIG. 1 is a perspective view of a work vehicle according to some embodiments

FIG. 1 illustrates an off-highway machine, such as an excavator 10, having a chassis 14 and a ground-engaging implement (e.g., tracks or crawler mechanisms 18) for supporting and propelling the chassis 14 and therefore the machine 10 along a surface. The crawler mechanisms 18 are oriented parallel to a longitudinal axis A of the chassis 14, which coincides with a forward direction of travel of the machine 10 during operation. In the illustrated embodiment, each crawler mechanism 18 includes a drive sprocket 42, an undercarriage frame 46, and a track 50. The drive sprocket 42 is driven by a prime mover 54 and engages the track 50. The track 50 is driven in an endless loop around the drive sprocket 42 and the undercarriage frame 46. The illustrated machine 10 further includes an operator cab 22, a boom 30, an arm 32, a bucket 34 supported on an end of the arm 32, a controller 56, and a user interface 58.

The boom 30 includes a first end that is pivotally connected to the chassis 14 and a second distal end. First and second boom cylinders 60a, 60b are connected to the chassis 14 and to the boom 30. The first and second arm cylinders 60a, 60b are operable to pivot the boom 30 with respect to the chassis 14. The arm 32 includes a first end pivotally connected to the second end of the boom 30 and a second distal end. An arm cylinder 62 is connected to the boom 30 and to the arm 32 and is operable to pivot the arm 32 with respect to the boom 30. The bucket 34 is connected to the distal end of the arm 32. A bucket cylinder 64 is connected to the arm 32 and to the bucket 34 via a pivot arm 36 and is operable to pivot the bucket 34 with respect to the arm 32 via the pivot arm 36. In the illustrated embodiment, the cylinders 60a, 60b, 62 and 64 are hydraulic cylinders, but other configurations can be utilized.

Although the off-highway machine 10 is illustrated and described as an excavator, it is understood that the off-highway machine 10 may have a different form, such as a loader, a dozer, a motor grader, a scraper, or another type of construction, mining, agricultural, or utility machine. Also, although the work attachment is illustrated and described as a bucket, it is understood that the work attachment may have a different form, such as an auger, a breaker, a ripper, a grapple, or some other type of attachment for digging, breaking, handling, carrying, dumping or otherwise engaging dirt or other material. In addition, the work attachment may be detachable from the arm 32 to permit another type of work attachment to be connected to the arm 32.

Figure 2:
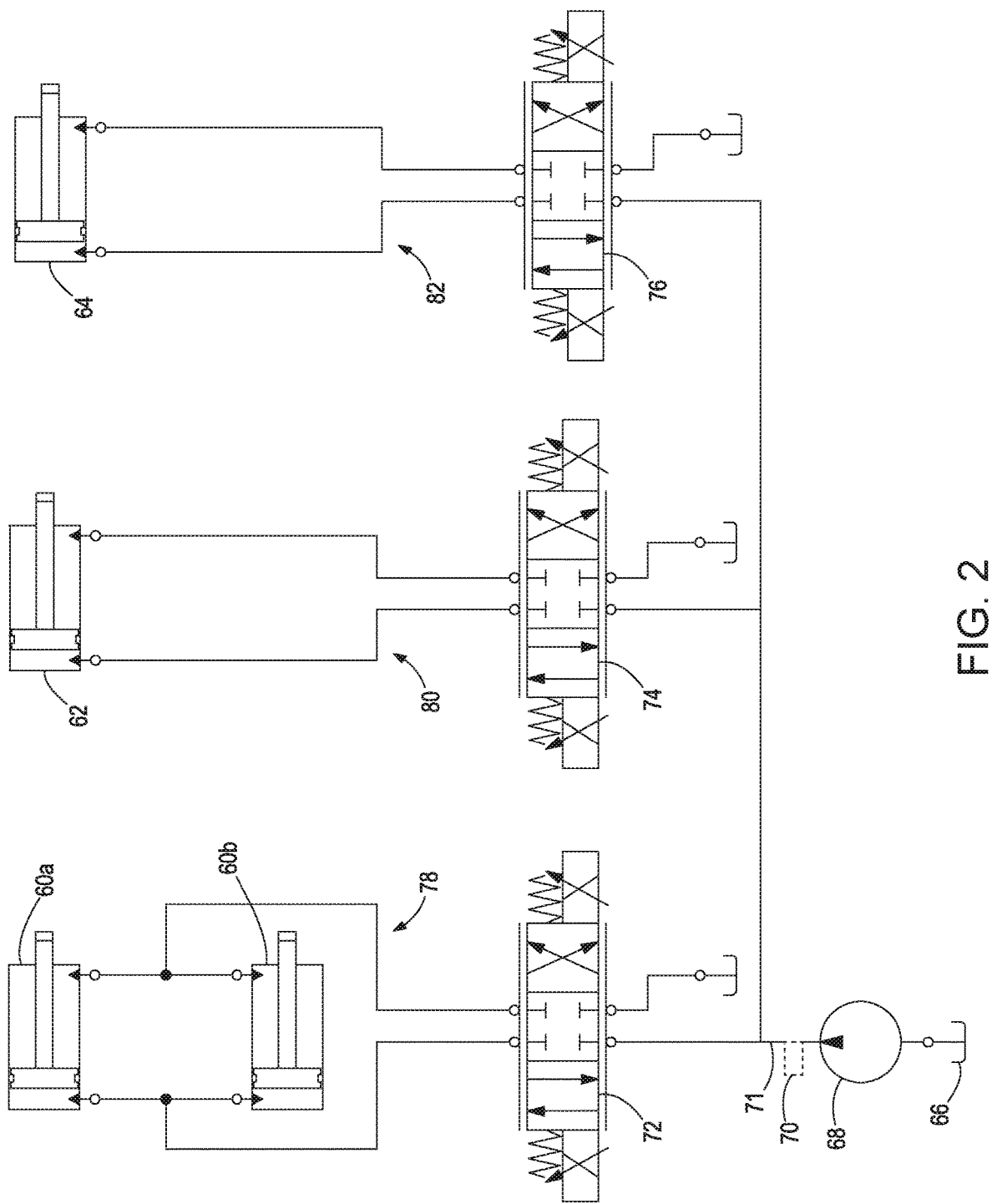
FIG. 2 is a first hydraulic schematic for the work vehicle of FIG. 1.

FIG. 2 illustrates a portion of a hydraulic fluid circuit of the hydraulic cylinders 60a, 60b, 62 and 64. The hydraulic circuit includes a fluid reservoir 66, a pump 68, an adjustable hydraulic quarter wave tuner 70, a conduit 71, a first control valve 72, a second control valve 74, a third control valve 76, a first flow circuit 78, a second flow circuit 80 and a third flow circuit 82. The pump 68 directs fluid from the fluid reservoir 66 toward one or more of the first, second and/or third control valves 72, 74 and 76.

The illustrated first control valve 72 is a proportional control valve which can control a volume of fluid permitted to flow through the first control valve 72. Therefore, in additional to fully open and fully closed, the first control valve 72 has multiple intermediate positions that permit some fluid to flow through the first control valve 72. The first control valve 72 is fluidly positioned between the pump 68 and the first flow circuit 78. When the first control valve 72 is either fully or partially open, the pump 68 moves fluid from the reservoir 66, through the first control valve 72 into the first flow circuit 78. The illustrated first flow circuit 78 includes two hydraulic cylinders 60a and 60b in parallel, but other quantities of hydraulic cylinders can be used. As discussed above, these hydraulic cylinders 60a and 60b are coupled to the chassis 14 and the boom 30 to pivot the boom 30 with respect to the chassis 14 (see FIG. 1).

The illustrated second control valve 74 is also a proportional control valve which can control a volume of fluid permitted to flow through the second control valve 74. Therefore, in additional to fully open and fully closed, the second control valve 74 has multiple intermediate positions that permit some fluid to flow through the second control valve 74. The second control valve 74 is fluidly positioned between the pump 68 and the second flow circuit 80. When the second control valve 74 is either fully or partially open, the pump 68 moves fluid from the reservoir 66, through the second control valve 74 into the second flow circuit 80. The illustrated second flow circuit 80 includes one hydraulic cylinder 62, but other quantities of hydraulic cylinders can be used. As discussed above, this hydraulic cylinder 62 is coupled to the boom 30 and to the arm 32 to pivot the arm 32 with respect to the boom 30 (see FIG. 1).

The illustrated third control valve 76 is also a proportional control valve which can control a volume of fluid permitted to flow through the third control valve 76. Therefore, in additional to fully open and fully closed, the third control valve 76 has multiple intermediate positions that permit some fluid to flow through the third control valve 76. The third control valve 76 is fluidly positioned between the pump 68 and the third flow circuit 82. When the third control valve 76 is either fully or partially open, the pump 68 moves fluid from the reservoir 66, through the third control valve 76 into the third flow circuit 82. The illustrated third flow circuit 82 includes one hydraulic cylinder 64, but other quantities of hydraulic cylinders can be used. As discussed above, this hydraulic cylinder 64 is coupled to the arm 32 and the work implement 34 to pivot the work implement 34 with respect to the arm 32 (see FIG. 1).

Figure 3:
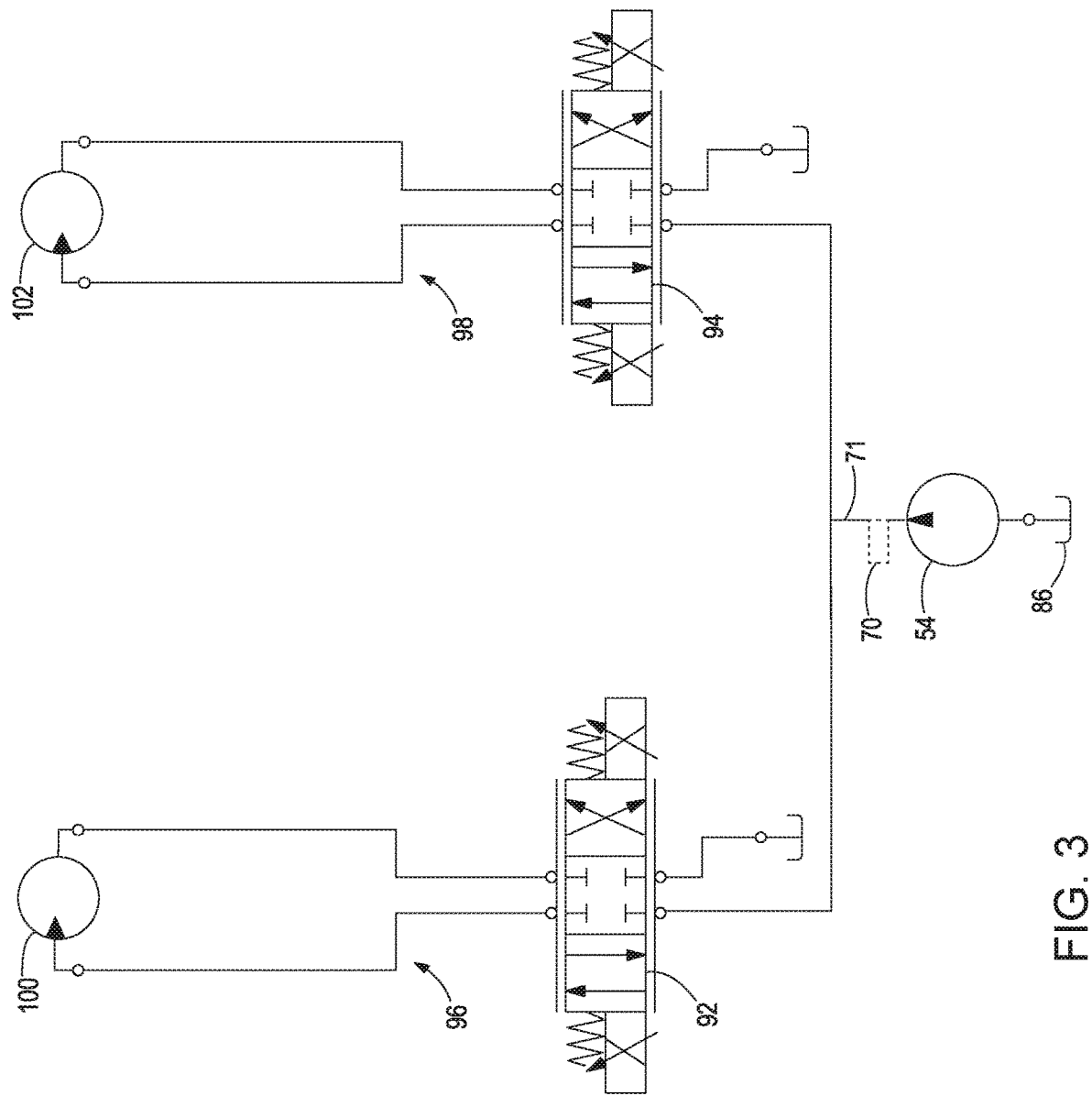
FIG. 3 is a second hydraulic schematic for the work vehicle of FIG. 1.

FIG. 3 illustrates a portion of a hydraulic fluid circuit of the drive sprockets 42 that each drive the track 50 of the respective crawler mechanism 18. The drive sprockets 42 are separately driven by the prime mover 54. The hydraulic circuit includes a fluid reservoir 86, the prime mover 54, the adjustable hydraulic quarter wave tuner 70, the conduit 71, a fourth control valve 92, a fifth control valve 94, a fourth flow circuit 96, and a fifth flow circuit 98. The prime mover 54 directs fluid from the fluid reservoir 86 toward one or both of the fourth and/or fifth control valves 92 and 94. In some embodiments, the reservoir 86 is combined with the reservoir 66, whereas in other embodiments, separate reservoirs 66 and 86 are utilized.

The illustrated fourth control valve 92 is a proportional control valve which can control a volume of fluid permitted to flow through the fourth control valve 92. Therefore, in additional to fully open and fully closed, the fourth control valve 92 has multiple intermediate positions that permit some fluid to flow through the fourth control valve 92. The fourth control valve 92 is fluidly positioned between the prime mover 54 and the fourth flow circuit 96. When the fourth control valve 92 is either fully or partially open, the prime mover 54 moves fluid from the reservoir 86, through the fourth control valve 92 into the fourth flow circuit 96. The illustrated fourth flow circuit 96 includes a first rotary actuator 100 configured to rotate the drive sprocket 42 of a first one of the tracks 50. In some embodiments, the first rotary actuator 100 is a hydraulic motor.

The illustrated fifth control valve 94 is also a proportional control valve which can control a volume of fluid permitted to flow through the fifth control valve 94. Therefore, in additional to fully open and fully closed, the fifth control valve 94 has multiple intermediate positions that permit some fluid to flow through the fifth control valve 94. The fifth control valve 94 is fluidly positioned between the prime mover 54 and the fifth flow circuit 98. When the fifth control valve 94 is either fully or partially open, the prime mover 54 moves fluid from the reservoir 86, through the fifth control valve 94 into the fifth flow circuit 98. The illustrated fifth flow circuit 98 includes a second rotary actuator 102 configured to rotate the drive sprocket 42 of a second one of the tracks 50. In some embodiments, the second rotary actuator 102 is a hydraulic motor.

Figure 4:
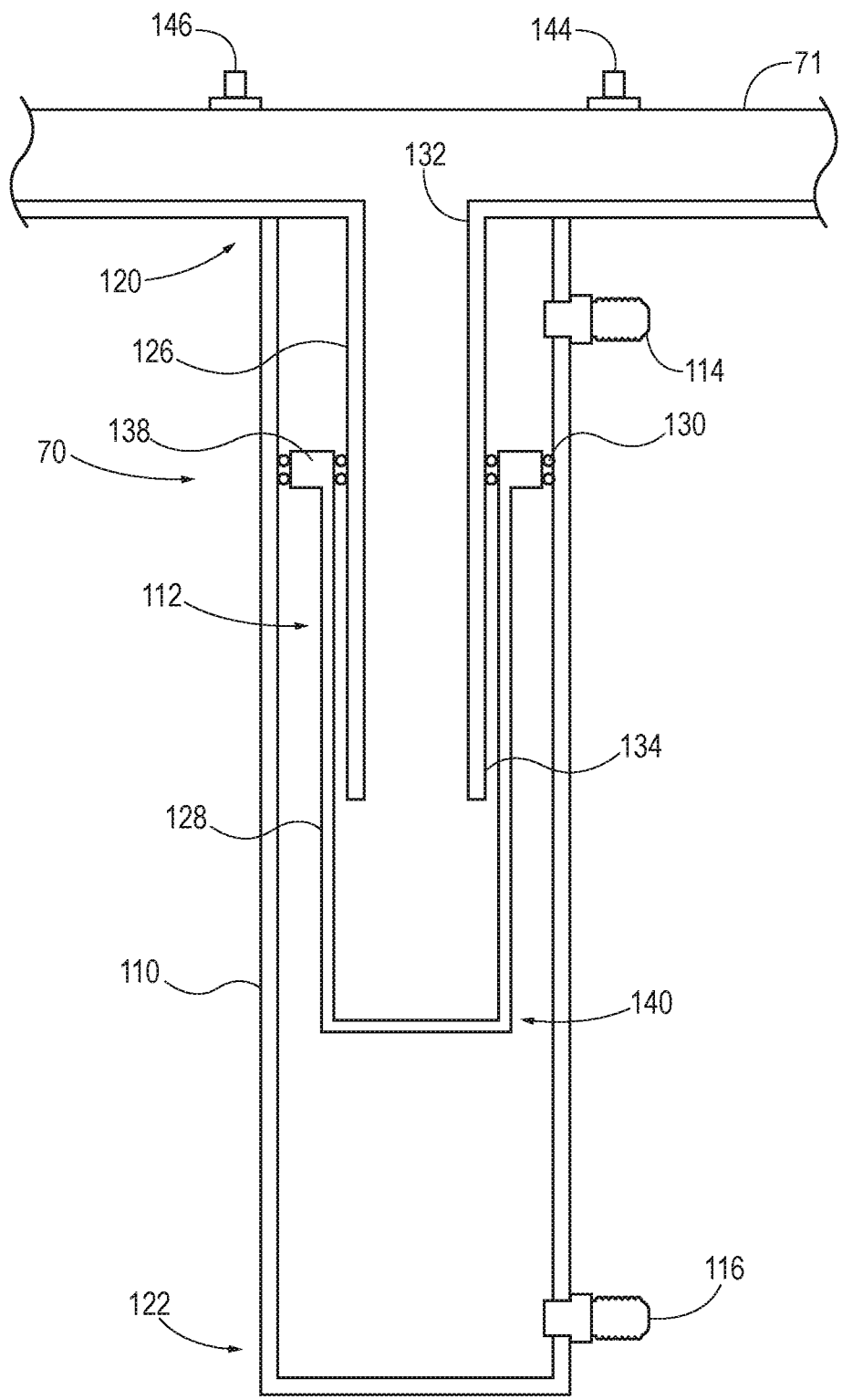
FIG. 4 is detailed view of a portion of the hydraulic schematics of FIGS. 2 and 3.

FIG. 4 illustrates one possible configuration of the adjustable hydraulic quarter wave tuner 70 that is utilized in both FIGS. 2 and 3. The adjustable hydraulic quarter wave tuner 70 includes a longitudinally extending sleeve 110, a plunger 112 positioned within the sleeve 110, a first port 114 and a second port 116. In some embodiments, the adjustable hydraulic quarter wave tuner 70 is rigid, whereas in other embodiments, the adjustable hydraulic quarter wave tuner 70 and can be installed in a variety of locations and configurations.

The longitudinally extending sleeve 110 includes a first open end 120 and a second closed end 122. The first open end 120 is fluidly connected to the conduit 71 shown in FIGS. 2 and 3 and the second closed end 122 is spaced from the first open end 120. The longitudinally extending sleeve 110 has an overall length extending from the first open end 120 to the second closed end 122.

The plunger 112 includes a stationary portion 126, an axially moveable portion 128 and seals 130 positioned between the stationary portion 126 and the axially moveable portion 128. The stationary portion 126 has a first open end 132 connected to the hydraulic circuit and a second open end spaced from the second open end 134. The stationary portion 126 receives fluid from the hydraulic circuit and discharges fluid into the hydraulic circuit. In the illustrated embodiment, the stationary portion 126 has a diameter that is substantially equal to a diameter of the hydraulic circuit.

The axially moveable portion 128 includes a first open end 138 connected to the stationary portion 126 via the seals 130 and a second closed end 140 spaced from the first open end 138. The axially moveable portion 128 is configured to move axially along the stationary portion 126 in a longitudinal direction to thereby change a length of the plunger 112. The plunger length is defined between the first open end 132 of the stationary portion 126 and the second closed end 140 of the axially moveable portion 128. The plunger 112 defines a first length while the axially moveable portion 128 is at a first end position and the plunger 112 defines a second length while the axially moveable portion 128 is at a second end position. The first open end 138 of the axially moveable portion 128 is positioned near the first open end 132 of the stationary portion 126 while the axially moveable portion 128 is in the first end position. The first open end 138 of the axially moveable portion 128 is positioned near the second open end 134 of the stationary portion 126 while the axially moveable portion 128 is in the second end position. The second length is greater than the first length. The axially moveable portion 128 is moveable to any position between the first end position and the second end position such that the plunger length is within a range of lengths between the first length and the second length.

The first port 114 and the second port 116 are fluidly connected to the hydraulic circuit to receive fluid from and dispense fluid to the hydraulic circuit. Fluid flow into and out of the first port 114 and the second port 116 causes movement of the axially moveable portion 128 along the stationary portion 126. In some embodiments, only one of the first port 114 and the second port 116 is connected to the hydraulic circuit and the other port is disconnected from the hydraulic circuit and in some cases is omitted entirely. For example, in some embodiments, the second port 116 is connected to the hydraulic circuit and the first port 114 is open to atmosphere. In these embodiments, fluid flow into and out of the second port 116 moves the axially moveable portion 128 along the stationary portion 126.

A first pressure sensor 144 is positioned adjacent the conduit 71 to sense a first pressure in the conduit 71 upstream of the adjustable hydraulic quarter wave tuner 70. A second pressure sensor 146 is positioned adjacent the conduit 71 to sense a second pressure in the conduit 71 downstream of the adjustable hydraulic quarter wave tuner 70. Other types and configurations of sensors can be utilized proximate the adjustable hydraulic quarter wave tuner 70.

Figure 5:
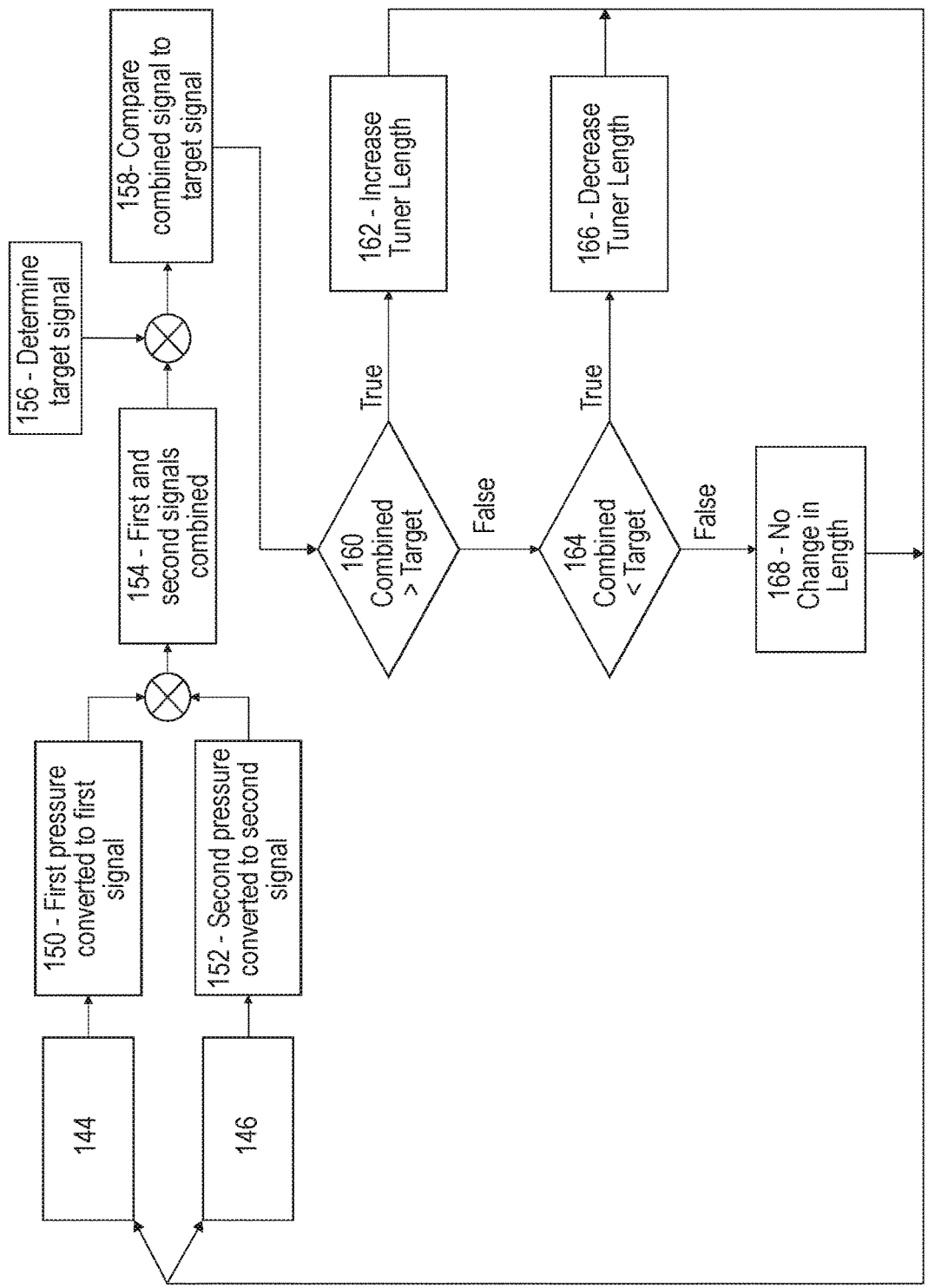
FIG. 5 is flow chart of one method of operation according to some embodiments.

FIG. 5 illustrates a flow chart of one possible mode of operation of the adjustable hydraulic quarter wave tuner 70. The first pressure sensor 144 senses a first pressure and communicates the first pressure to the controller 56. At step 150, the controller 56 converts the first pressure into a first signal. The second pressure sensor 146 senses a second pressure and communicates the second pressure to the controller 56. At step 152, the controller converts the second pressure into a second signal. In some embodiments, the first and second signals are frequency and amplitude signals, such as a fast Fourier transform (FFT) signal. The first signal and the second signal are combined at step 154 into a combined signal. In some embodiments, the combined signal is a current frequency comprising a sum of the first and second FFT signals. In some embodiments, the controller utilizes the combined signal to determine a length of the adjustable hydraulic quarter wave tuner 70.

At step 156, the controller 56 determines a target signal from a look-up table. In some embodiments, the target signal is related to a speed of vehicle engine as well as specific characteristics of the pump 54, 68 being utilized. In some embodiments, the target signal is a frequency and amplitude signal, such as an FFT signal. In some embodiments, the target signal is a desired length of the adjustable hydraulic quarter wave tuner 70.

At step 158, the controller 56 compares the combined signal to the target signal. At step 160, the controller 56 determines if the combined signal is greater than the target signal. If the combined signal is greater than the target signal, operation moves to step 162. At step 162, the length of the adjustable hydraulic quarter wave tuner 70 is increased. If the combined signal is not greater than the target signal, operation moves to step 164. At step 164, the controller 56 determines if the combined signal is less than the target signal. If the combined signal is less than the target signal, operation moves to step 166. At step 166, the length of the adjustable hydraulic quarter wave tuner 70 is decreased. If the combined signal is not less than the target signal, operation moves to step 168. At step 168, the length of the adjustable hydraulic quarter wave tuner 70 is not changed. Operation then returns to the first sensor 144 and the second sensor 146 and communicates a first pressure sensed by the first pressure sensor 144 and a second pressure sensed by the second pressure sensor 146 to the controller 56.

What is claimed is:

1. A work vehicle comprising:
   a chassis;
   a member connected to the chassis for movement with respect to the chassis;
   an actuator connected to the chassis and to the member, the actuator configured to move the member with respect to the chassis;
   a hydraulic circuit fluidly connected to the actuator;
   a pump configured to pressurize fluid in the hydraulic circuit;
   an adjustable quarter wave tuner fluidly connected to the hydraulic circuit, the adjustable quarter wave tuner having a length that is adjustable within a range of lengths to thereby reduce noise caused by the pump across a corresponding range of frequencies;
   a controller; and
   a sensor in electrical communication with the controller, the sensor positioned proximate to the adjustable quarter wave tuner, the sensor configured to sense a pressure in the hydraulic circuit and to communicate the sensed pressure to the controller,
   wherein the controller is configured to determine a present length of the adjustable quarter wave tuner and to determine a desired length of the adjustable quarter wave tuner based upon the sensed pressure.

2. The work vehicle of claim 1, wherein the member is a boom and the actuator is a boom actuator, further comprising an arm connected to a free end of the boom for rotation with respect to the boom and an arm actuator connected to the boom and the arm to thereby rotate the arm with respect to the boom, wherein the arm actuator is fluidly connected to the hydraulic circuit.

3. The work vehicle of claim 2, further comprising a bucket connected to a free end of the arm for rotation with respect to the arm, and a bucket actuator connected to the arm and the bucket to thereby rotate the bucket with respect to the arm, wherein the bucket actuator is fluidly connected to the hydraulic circuit.

4. The work vehicle of claim 1, wherein the actuator is a rotary actuator and the member is a ground-engaging element that is moveable with respect to the chassis to thereby move the chassis along a ground surface.

5. The work vehicle of claim 1, wherein the controller is configured to compare the present length to the desired length and
   in response to the present length being greater than the desired length, the controller is configured to decrease a tuner length,
   in response to the present length being less than the desired length, the controller is configured to increase the tuner length, and
   in response to the present length being equal to the desired length, the controller is configured to maintain the tuner length at the present length.

6. The work vehicle of claim 1, further comprising a controller,
   a first sensor electrically connected to the controller, the first sensor positioned upstream of the adjustable quarter wave tuner, the first sensor configured to sense a first pressure in the hydraulic circuit, and to communicate the first pressure to the controller, and
   a second sensor electrically connected to the controller, the second sensor positioned downstream of the adjustable quarter wave tuner, the second sensor configured to sense a second pressure in the hydraulic circuit, and to communicate the second pressure to the controller.

7. The work vehicle of claim 6, wherein the controller is configured to convert the first pressure into a first signal, is configured to convert the second pressure into a second signal, and is configured to combine the first signal and the second signal into a combined signal.

8. The work vehicle of claim 7, wherein the controller is configured to compare the combined signal to a target signal and
in response to the combined signal being greater than the target signal, the controller is configured to decrease a tuner length,
in response to the combined signal being less than the target signal, the controller is configured to increase the tuner length, and
in response to the combined signal being equal to the target signal, the controller is configured to maintain the tuner length.

9. The work vehicle of claim 6, wherein the controller is configured to convert the first pressure into a first frequency, is configured to convert the second pressure into a second frequency, and is configured to combine the first frequency and the second frequency into a combined frequency.

10. The work vehicle of claim 9, wherein the controller is configured to compare the combined frequency to a target frequency,
in response to the combined frequency being greater than the target frequency, the controller is configured to decrease a tuner length,
in response to the combined frequency being less than the target frequency, the controller is configured to increase the tuner length, and
in response to the combined frequency being equal to the target frequency, the controller is configured to maintain the tuner length.

11. A work vehicle comprising:
a chassis;
a member connected to the chassis for movement with respect to the chassis;
an actuator connected to the chassis and to the member, the actuator configured to move the member with respect to the chassis;
a hydraulic circuit fluidly connected to the actuator;
a pump configured to pressurize fluid in the hydraulic circuit;
an adjustable quarter wave tuner fluidly connected to the hydraulic circuit, the adjustable quarter wave tuner having a length that is adjustable within a range of lengths to thereby reduce noise caused by the pump across a corresponding range of frequencies,
wherein the adjustable quarter wave tuner includes a longitudinally extending sleeve having a first end connected to the hydraulic circuit and a second end spaced from the first end, the adjustable quarter wave tuner also includes a plunger positioned within the sleeve, the plunger is configured to move in a longitudinal direction between a first end position and a second end position.

12. The work vehicle of claim 11, wherein the sleeve defines a first length while the plunger is in the first end position and the sleeve defines a second length while the plunger is in the second end position, the second length being greater than the first length.

13. The work vehicle of claim 12, wherein the plunger is moveable to any position between the first end position and the second end position such that the sleeve defines a sleeve length within a range of lengths between the first length and the second length.

14. The work vehicle of claim 11, further comprising a first port fluidly connecting a first portion of the sleeve to the hydraulic circuit and a second port fluidly connecting a second portion of the sleeve to the hydraulic circuit, such that the plunger is moveable along the sleeve in response to fluid flow from the hydraulic circuit through the first port and through the second port.

15. A hydraulic circuit comprising:
a reservoir configured to retain hydraulic fluid;
an actuator fluidly connected to the reservoir;
a pump fluidly connected to the reservoir and to the actuator, the pump configured to move fluid from the reservoir to the actuator;
an adjustable quarter wave tuner fluidly connected to the actuator and to the pump, the adjustable quarter wave tuner having a length that is adjustable within a range of lengths to thereby reduce noise caused by the pump across a corresponding range of frequencies;
a first sensor positioned upstream of the adjustable quarter wave tuner, the first sensor configured to sense a first pressure in the hydraulic circuit;
a second sensor positioned downstream of the adjustable quarter wave tuner, the second sensor configured to sense a second pressure in the hydraulic circuit; and
a controller in communication with the first sensor to receive the first pressure from the first sensor, and in communication with the second sensor to receive the second pressure from the second sensor, the controller connected to the adjustable quarter wave tuner to thereby adjust the length of the adjustable quarter wave tuner in response to the first pressure and the second pressure;
wherein the controller is configured to convert the first pressure into a first signal, is configured to convert the second pressure into a second signal, and is configured to combine the first signal and the second signal into a combined signal.

16. The hydraulic circuit of claim 15, wherein the controller is configured to determine a present length of the adjustable quarter wave tuner and to determine a desired length of the adjustable quarter wave tuner based upon the sensed pressure, wherein the controller is configured to compare the present length to the desired length, and
in response to the present length being greater than the desired length, the controller is configured to decrease a tuner length,
in response to the present length being less than the desired length, the controller is configured to increase the tuner length, and
in response to the present length being equal to the desired length, the controller is configured to maintain the tuner length.

17. The hydraulic circuit of claim 15, wherein the adjustable quarter wave tuner includes a longitudinally extending sleeve having a first end connected to the hydraulic circuit and a second end spaced a total length from the first end, the adjustable quarter wave tuner also includes a plunger positioned within the sleeve, the plunger is configured to move in a longitudinal direction between a first end position and a second end position.

18. The hydraulic circuit of claim 17, wherein the sleeve defines a first length while the plunger is in the first end position, and the sleeve defines a second length while the plunger is in the second end position, the second length being greater than the first length, and the total length being greater than the second length, wherein the plunger is moveable to any position between the first end position and the second end position such that the sleeve defines a sleeve length within a range of lengths between the first length and the second length.

* * * * *